(12) United States Patent
Lim et al.

(10) Patent No.: US 6,846,899 B2
(45) Date of Patent: Jan. 25, 2005

(54) POLY(ARYLENE ETHER) DIELECTRICS

(75) Inventors: Christopher Lim, Singapore (SG); Siu Choon Ng, Singapore (SG); Hardy Chan, Singapore (SG); Simon Chooi, Singapore (SG); Mei Sheng Zhou, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 122 days.

(21) Appl. No.: 10/262,144

(22) Filed: Oct. 1, 2002

(65) Prior Publication Data

US 2004/0068082 A1 Apr. 8, 2004

(51) Int. Cl.⁷ ............................................. C08G 65/00
(52) U.S. Cl. .............................. 528/86; 428/53; 427/97; 427/80
(58) Field of Search ............................. 528/86; 428/53; 427/97, 80

(56) References Cited

U.S. PATENT DOCUMENTS

| | | | |
|---|---|---|---|
| 5,658,994 A | 8/1997 | Burgoyne, Jr. et al. | 525/390 |
| 5,874,516 A | 2/1999 | Burgoyne, Jr. et al. | 528/219 |
| 6,147,009 A | 11/2000 | Grill et al. | 438/780 |
| 6,271,272 B1 | 8/2001 | Carlier et al. | 521/56 |
| 6,280,794 B1 | 8/2001 | Tu et al. | 427/379 |
| 6,303,523 B2 | 10/2001 | Cheung et al. | 438/780 |

OTHER PUBLICATIONS

Wang et al; Method of making a slot via filled dual damascene—circuits; May 2002; Advanced micro devices, Inc., Chem Abstract 136: 378486.*

(List continued on next page.)

*Primary Examiner*—Duc Truong
(74) *Attorney, Agent, or Firm*—George O. Saile; Rosemary L.S. Pike

(57) ABSTRACT

The present invention relates to poly(arylene ethers) used as low k dielectric layers in electronic applications and articles containing such poly(arylene ethers) comprising the structure:

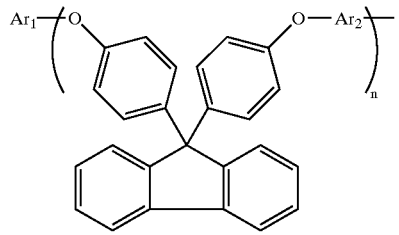

wherein n=5 to 10000 and monovalent $Ar_1$ and divalent $Ar_2$ are selected from a group of heteroaromatic compounds that incorporate O, N, Se, S, or Te or combinations of the aforesaid elements, including but not limited to:

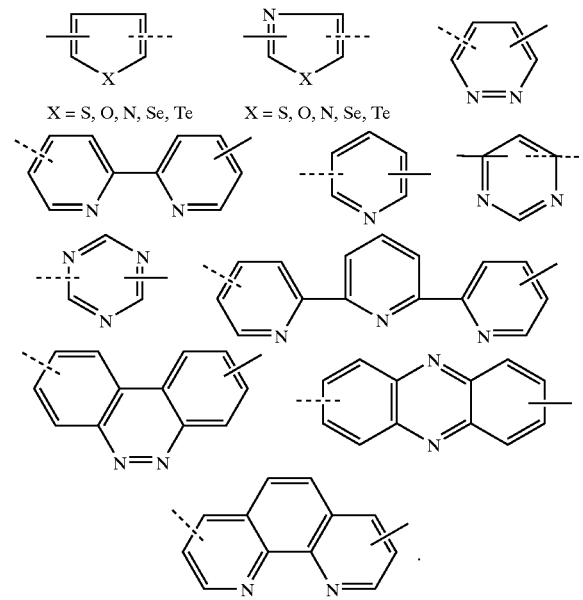

10 Claims, 1 Drawing Sheet

OTHER PUBLICATIONS

Wang et al; Method of making a via filled dual damascene—fabrication; Apr. 2002; Advanced Micro devices; Chem Abstract 136: 302790.*

F. Cotton et al., "Advanced Inorganic Chemistry" published by Interscience Publishers 1966 p. 896.

* cited by examiner

POLY(ARYLENE ETHER) DIELECTRICS

FIELD OF THE INVENTION

The invention relates to the field of dielectric materials. More particularly, the present invention is directed to poly (arylene ethers) containing pyridine and thiophene moieties used as low dielectric insulating layers in electronics applications and articles containing such poly(arylene ethers).

BACKGROUND OF THE INVENTION

Microelectronics fabrication involves the manufacture of integrated circuits which uses dielectric materials as insulating layers between various circuits and layers of circuits. As the device dimensions of advanced microelectronics integrated circuits continue to shrink, the increase in propagation delay, capacitance coupling between two or more conductive features and power dissipation of the interconnect structure become significant limiting factors.

The capacitance between two or more conductive features is proportional to the dielectric constant, k, of the material which separates the features. These features are usually vias for vertical connections between layers and trenches for horizontal connections within a layer. A dielectric material with a low k value is desirable in reducing the tendency for higher capacitance coupling when conductive features are brought closer together in more advanced circuit designs.

Silicon dioxide which has been typically used as a dielectric material in the microelectronics fabrication industry has a k value of about 4. There is a need for new dielectric materials with a k value below 3. A method of lowering the dielectric constant of silicon oxide is described in U.S. Pat. No. 6,147,009 where a hydrogenated oxidized silicon carbon material (SiCOH) is formed in a chemical vapor deposition (CVD) chamber. Another low k material comprised of carbon doped silicon oxide that is deposited by a CVD method is described in U.S. Pat. No. 6,303,523. To successfully replace silica as a dielectric material, a polymeric material must have a thermal stability to at least 350° C. which is a typical temperature at which dielectric films are cured if they are spin coated on a substrate.

U.S. Pat. No. 6,280,794 discloses a method of forming dielectric material with a low k value by forming pores within a dielectric polymer. The pores contain air with a dielectric constant of 1 which reduces the k value of the two phase film proportional to the volume fraction of air in the polymer film.

U.S. Pat. Nos. 5,874,516 and 5,658,994 disclose poly (arylene ethers) which do not contain any functionalized or reactive groups in the polymer. The utility of these polymers is recited to be for low dielectric insulating layers in integrated circuits and articles containing such poly(arylene ethers).

A trend in the microelectronics fabrication industry is to replace the current conductive material which is aluminum with lower resistivity materials such as copper. Copper or copper ions that diffuse away from the conductive feature can reduce the performance of the device. A dielectric material that has the additional property of being able to trap copper or copper ions and prevent them from diffusing is highly desirable. F. Cotton and G. Wilkinson in "Advanced Inorganic Chemistry" published by Interscience Publishers (1966), page 896 write that cuprous complexes of pπ bonding ligands are known. Aromatic compounds with a lone pair of electrons like pyridine or thiophene are capable of forming π complexes with metals through their p orbitals.

SUMMARY OF THE INVENTION

An objective of the present invention is to provide a low k dielectric material in which k is less than 3 for the fabrication of integrated circuits in electronic or microelectronic devices.

A further objective is that said low k dielectric material has a thermal stability of about 350° C. or greater after curing on a substrate.

A still further objective is that said dielectric layer traps copper or copper ions to prevent undesirable diffusion from a conductive layer through the dielectric layer to other parts of the device.

These objectives are achieved by the present invention which offers an improved dielectric material. More particularly, the dielectric material is a poly(arylene ether) comprising the structure:

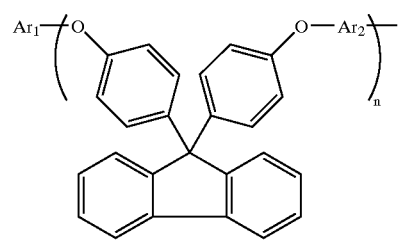

wherein n=5 to 10000; and monovalent radical $Ar_1$ and divalent radical $Ar_2$ are selected from the group of heteroaromatic compounds that incorporate O, N, Se, S, or Te or combinations of the aforesaid elements including but not limited to:

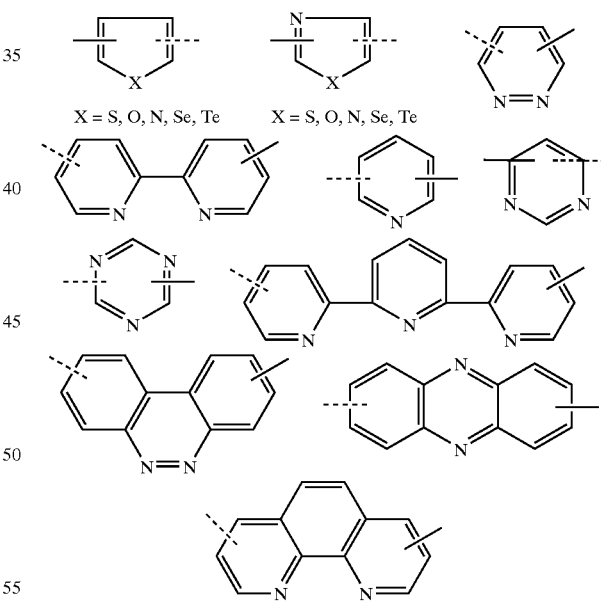

In one embodiment, the dielectric material of the present invention is formed as a cap layer on a dual or single damascene structure. The low k dielectric material is dissolved in an organic solvent and spin coated on a substrate followed by baking to cure the film and form a stable layer.

In another embodiment, the dielectric material is provided between dielectric layers (insulating layers) in an integrated circuit and functions as an etch stop layer in a damascene structure. The low k dielectric material is spin coated from a solution and then baked to remove solvent and cure the film.

More preferably, the dielectric layer is provided between two conductive layers in an integrated circuit. More particularly, the dielectric material is an intermetal dielectric in a dual or single damascene structure.

The present invention is also a multilayer microelectronic integrated circuit article comprising (i) a silicon, glass, silicon-germanium, or ceramic substrate, (ii) one or more layers of a conductive material contained within or on said substrate; and (iii) one or more dielectric layers contained within or on said substrate, at least one of said dielectric layers comprised of a poly(arylene ether) having the structure:

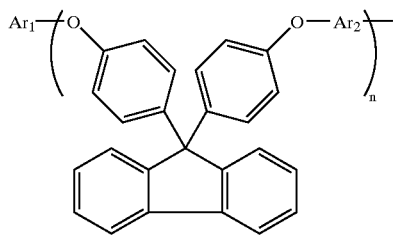

wherein n=5 to 10000; and monovalent radical $Ar_1$ and divalent radical $Ar_2$ are selected from the group of heteroaromatic compounds that incorporate O, N, Se, S, or Te or combinations of the aforesaid elements including but not limited to:

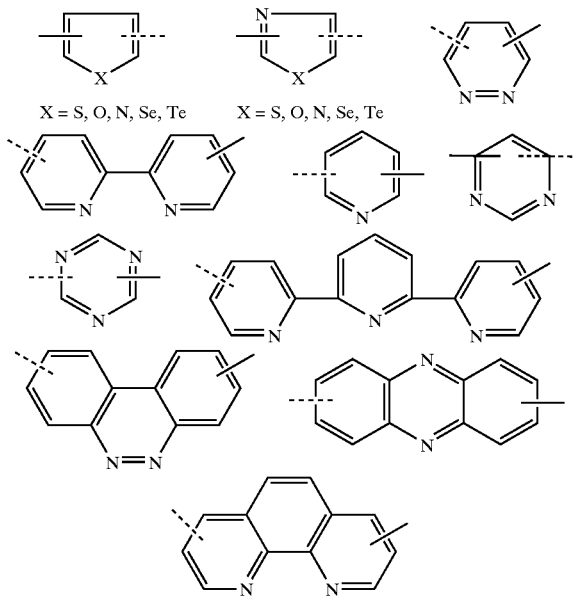

The poly(arylene ether) structures described above will hereafter be referred to as poly(arylene ether) I for purposes of clarification.

DETAILED DESCRIPTION OF THE INVENTION

The present invention relates to a dielectric material provided (i) as an insulating layer between conductive layers in an integrated circuit, (ii) as an etch stop layer between insulating layers in an integrated circuit, or (iii) as a passivation layer between a conductive layer and an insulating layer in an integrated circuit.

Figure 1:
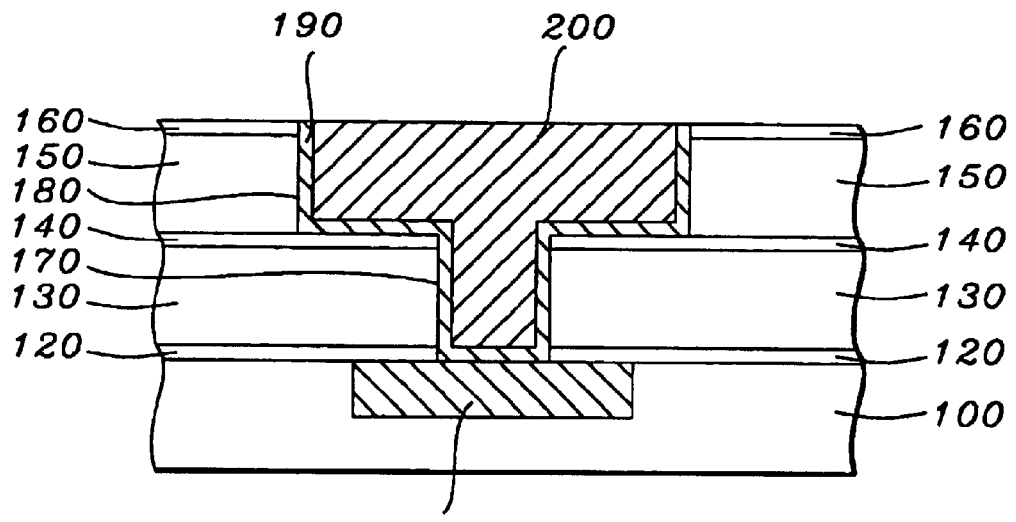
FIGS. 1 and 2 are cross sectional views of a dual damascene structure having a low k dielectric material of the invention in one or more layers.

With specific reference to devices featuring dual damascene interconnects as depicted in FIG. 1, the poly(arylene ether) 1 of the present invention can function a a dielectric material in one or more of the following parts of the interconnect structure: intermetal dielectric layers 150 and 170 which are adjacent to the conductor metal 130; passivation layer 120 which is on the conductive layer 110 and on substrate 100; etch stop layer 160; and cap (etch stop) layer 140. Note that poly(arylene ether) 1 is described in a separate embodiment in a later section and may be used interchangeably with poly(arylether) 1.

In one embodiment, a substrate 100 is provided in which a conductive layer 110 has been formed. Substrate 100 is typically silicon or silicon/germanium and should be understood to possibly include one or more active devices, one or more passive devices, and one or more dielectric layers in a substructure (not shown). Conductive layer 110 is imbedded in a dielectric layer which is not shown in order to simplify the drawing and direct attention to the key features of the present invention. Conductive layer 110 is comprised of a material like copper or a copper alloy, tungsten or a tungsten alloy, or aluminum or an aluminum alloy.

A passivation layer 120 comprised of poly(arylether) 1 is formed by spin coating a solution of poly(arylene ether) 1 on substrate 100 and on conductive layer 110 followed by baking to cure the film. Films or coatings of the poly(arylene ether) 1 can be formed by spin coating or spraying, with spin coating preferred. Preferred solvents for dissolution of the polymer include cyclohexanone, cyclopentanone, chloroform, toluene, xylene, chlorobenzene, N,N-dimethylformamide, methyl isobutyl ketone, N-methyl pyrrolidinone and mixtures thereof. Additives such as stabilizers, surfactants and the like can be added to improve shelf life stability of the polymer in solution or to enhance its film forming properties. Adhesion promoters may be used to improve adhesion of the poly(arylene ether) 1 to the substrate. Typically, the films are spun to a thickness of between 1000 and 15,000 Angstroms. It is preferred that baking between 50° C. and 250° C. for a period of between 0.5 and 30 minutes followed by curing (in furnace or rapid thermal annealing) between 200° C. and 400° C. for a period of between 5 and 120 minutes should take place after spin coating. Passivation layer 120 protects conductive layer 110 from chemicals and etchants used in subsequent processes employed to form a via hole and trench.

Next a dielectric layer 130 is deposited preferably by a CVD method. The dielectric layer is comprised of a material such as $SiO_2$, carbon or fluorine doped silicon oxide, polysilsesquioxanes, borosilicate glass, borophosphosilicate glass, and polyimide. Optionally, an organic material such as FLARE from Allied Signal or SILK from Dow Corning may be spin coated and cured by baking to form a dielectric layer 130.

An etch stop layer 140 is then formed on dielectric layer 130 by spin coating and curing poly(arylene ether) 1 by the same process as described for passivation layer 120. Optionally, an etch stop material such as silicon nitride, silicon carbide, or silicon oxynitride may be deposited instead of the poly(arylene ether) 1.

A second dielectric layer 150 is then deposited by a CVD technique or the like and is selected from the same candidates as mentioned for dielectric layer 130. Then a dielectric cap layer 160 that serves as an etch stop layer for a subsequent chemical mechanical polish step is deposited. Cap layer 160 is comprised of poly(arylene ether) 1 that is formed by spin coating and baking processes described for passivation layer 120. Optionally, a material such as silicon nitride, silicon carbide, or silicon oxynitride may be deposited as cap layer 160.

Conventional photolithography and etch processes are employed to form a via hole 170 and a trench 180 as shown in FIG. 1. A barrier metal layer 185 is deposited on the sidewalls and bottom of via 170 and trench 180 by a CVD method and is comprised of a material such as Ta, Ti, W, TaN, TiN, WN, TiW, or TaSiN. Barrier metal layer 185 is intended to prevent metal diffusion from the interconnect into the adjacent dielectric and etch stop layers and also protects the metal within the interconnect from moisture or other agents in an adjacent dielectric or etch stop layer that might attack said metal. A metal layer 200 is then deposited by electroplating, evaporating, or sputtering to fill via 170 and trench 180. The metal layer 200 is selected from the same set of materials that were mentioned previously as candidates from conductive layer 110. Since the deposition process provides a metal layer 200 that extends above cap layer 160, a CMP step is used to lower the level of metal layer 200 until it is contained only within via 170 and trench 180 and is coplanar with the top of cap layer 160.

By serving as one or more etch stop layers and as a cap layer in the dual damascene structure illustrated in FIG. 1, poly(arylene ether) 1 with its low k dielectric constant is able to reduce the capacitive coupling between metal wiring and improve the performance of the device. Note that alternative materials such as silicon nitride and silicon oxynitride have higher k values and are not as effective in preventing capacitive coupling.

Figure 2:
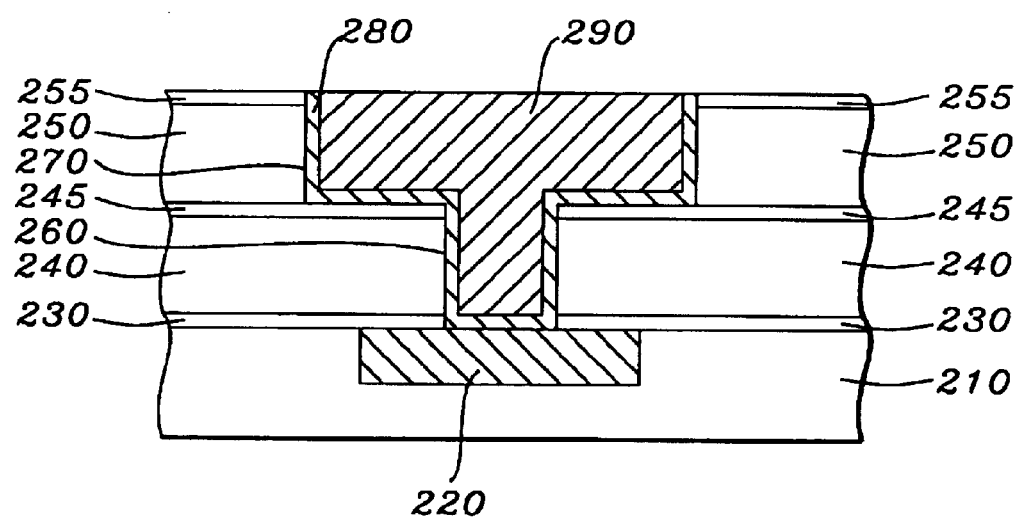

In a second embodiment, a substrate 210 is provided in which a conductive layer 220 has been formed as shown in FIG. 2. Substrate 210 is typically silicon or silicon/germanium and should be understood to possibly include one or more active devices, one or more passive devices, and one or more dielectric layers in a substructure (not shown). Conductive layer 220 is imbedded in a dielectric layer which is not shown in order to simplify the drawing and direct attention to the key features of the present invention. Conductive layer 220 is comprised of a material like copper or a copper alloy, tungsten or a tungsten alloy, or aluminum or an aluminum alloy. A passivation layer 230 comprised of a material such as silicon nitride, silicon carbide or silicon oxynitride is deposited on substrate 210 and on conductive layer 220 by a CVD technique.

Next a dielectric layer 240 is formed by spin coating a solution of poly(arylene ether) 1 followed by baking to cure the film. Films or coatings of the poly(arylene ether) 1 can be formed by spin coating or spraying, with spin coating preferred. Preferred solvents for dissolution of the polymer include cyclohexanone, cyclopentanone, chloroform, toluene, xylene, chlorobenzene, N,N-dimethylformamide, methyl isobutyl ketone, N-methyl pyrrolidinone and mixtures thereof. Additives such as stabilizers, surfactants and the like can be added to improve shelf life stability of the polymer in solution or to enhance its film forming properties. Adhesion promoters may be used to improve adhesion of the poly(arylene ether) 1 to the substrate. Typically, the films are spun to a thickness of between 1000 and 15,000 Angstroms. It is preferred that baking between 50° C. and 250° C. for a period of between 0.5 and 30 minutes followed by curing (in furnace or rapid thermal annealing) between 200° C. and 400° C. for a period of between 5 and 120 minutes should take place after spin coating.

An etch stop layer 245 is then deposited and selected from the same group of materials as described for passivation layer 230. A second dielectric layer 250 is formed with the same material and technique as used to apply dielectric layer 240. The damascene stack is completed by depositing cap layer 255 which is also selected from the same group of materials as mentioned for passivation layer 230 and etch stop layer 245. Conventional photolithography and etch processes are employed to form a via hole 260 and trench 270 in the damascene stack. A barrier layer 280 comprised of Ti, Ta, W, TiN, TaN, WN, TiW, or TaSiN or a similar material that is deposited on the sidewalls and bottom of via 260 and trench 270. Barrier layer 280 is intended to prevent metal diffusion from the interconnect into adjacent dielectric and etch stop layers and also protects the metal within the interconnect from moisture or other agents in an adjacent dielectric or etch stop layer that might attack said metal. A metal layer 290 is then deposited by electroplating, evaporating, or sputtering to fill via 260 and trench 270. The metal layer 290 is selected from the same set of materials that were mentioned previously as candidates from conductive layer 220. Since the deposition process provides a metal layer 290 that extends above cap layer 255, a CMP step is used to lower the level of metal layer 290 until it is contained only within via 260 and trench 270 and is coplanar with the top of cap layer 255.

As dielectric layers 240, 250 in the dual damascene structure illustrated in FIG. 2, poly(arylene ether) 1 with its low k dielectric constant is able to reduce the capacitive coupling between metal wiring and improve the performance of the device. Since poly(arylene ether) 1 in dielectric layers 240, 250 has a thermal stability about 350° C. or greater, the dielectric layer is able to remain in the device as a permanent layer. Furthermore, dielectric layers 240, 250 have an added desirable feature in that they contain heteroaromatic functionality that can complex with metals such as copper and prevent them from diffusing through insulating layers and degrading the performance of the resulting device.

Figure 3:
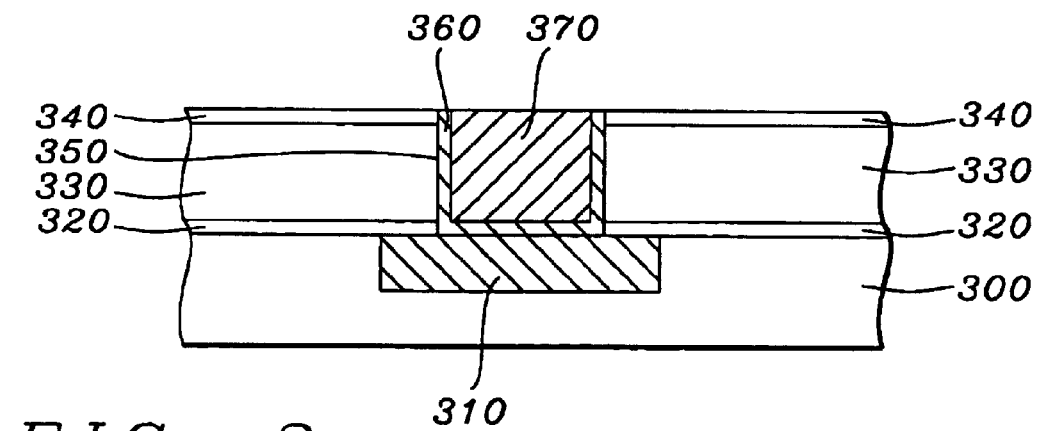
FIG. 3 is a cross sectional view of a single damascene structure including low k dielectric materials of the invention in one or more layers.

With specific reference to devices featuring single metal interconnects such as the single damascene structure shown in FIG. 3, poly(arylene ether) 1 can function as a passivation layer 320 which is on the conductive layer 310 and on substrate 300; as a cap layer 340, or preferably as an intermetal dielectric layer 330.

In a third embodiment, a substrate 300 is provided in which a conductive layer 310 has been formed. Substrate 300 is typically silicon or silicon/germanium and should be understood to possibly include one or more active devices, one or more passive devices, and one or more dielectric layers in a substructure (not shown). Conductive layer 310 is imbedded in a dielectric layer which is not shown in order to simplify the drawing and direct attention to the key features of the present invention. Conductive layer 310 is comprised of a material like copper or a copper alloy, tungsten or a tungsten alloy, or aluminum or an aluminum alloy. A passivation layer 320 comprised of a material such as silicon nitride, silicon carbide, or silicon oxynitride is deposited on substrate 300 and on conductive layer 310.

Next a dielectric layer 330 is formed by spin coating a solution of poly(arylene ether) 1 followed by baking to cure the film. Films or coatings of the poly(arylene ether) 1 can be formed by spin coating or spraying, with spin coating preferred. Preferred solvents for dissolution of the polymer include cyclohexanone, cyclopentanone, chloroform, toluene, xylene, chlorobenzene, N,N-dimethylformamide, methyl isobutyl ketone, N-methyl pyrrolidinone and mixtures thereof. Additives such as stabilizers, surfactants and the like can be added to improve shelf life stability of the polymer in solution or to enhance its film forming properties. Adhesion promoters may be used to improve adhesion of the poly(arylene ether) 1 to the substrate. Typically, the films are spun to a thickness of between 1000 and 15,000 Angstroms. It is preferred that baking between 50° C. and 250° C. for a period of between 0.5 and 30 minutes followed by curing (in furnace or rapid thermal annealing) between 200° C. and 400° C. for a period of between 5 and 120 minutes should take place after spin coating.

A cap dielectric layer 340 that also functions as an etch stop layer for a subsequent CMP step is then deposited on dielectric layer 330. Cap layer 340 is selected from the same group of materials as described for passivation layer 320. An opening 350 such as a trench or contact hole is then formed in cap layer 340 and in dielectric layer 330 by conventional photolithography and etch processes. Optionally, a barrier metal layer 360 comprised of a material such as Ti, Ta, W, TiN, TaN, WN, TiW, or TaSiN is deposited on the sidewalls and bottom of opening 350. A metal layer 370 is deposited to fill opening 350 and the deposition is followed by a CMP step to planarize metal layer 370 so that it is contained within opening 350 and becomes coplanar with the top of cap layer 340. Dielectric layer 330 comprised of poly (arylene ether) 1 with its low k dielectric constant is able to reduce the capacitive coupling between metal wiring and improve the performance of the device. Since poly(arylene ether) 1 in dielectric layer 330 has a thermal stability of about 350° C. or greater, the dielectric layer is able to remain in the device as a permanent layer. Furthermore, dielectric layer 330 has an added desirable feature in that said layer contains heteroaromatic functionality that can complex with metals like copper and prevent them from diffusing through insulating layers and degrading the performance of the resulting device.

The present invention is also a composition comprised of a poly(arylene ether) 1 comprising the structure:

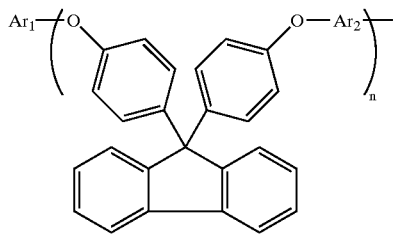

wherein n=5 to 10000; and monovalent radical $Ar_1$ and divalent radical $Ar_2$ are selected from heteroaromatic groups that incorporate O, N, Se, S, or Te or combinations of the aforesaid elements including but not limited to:

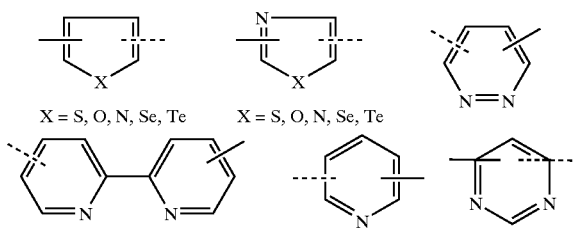

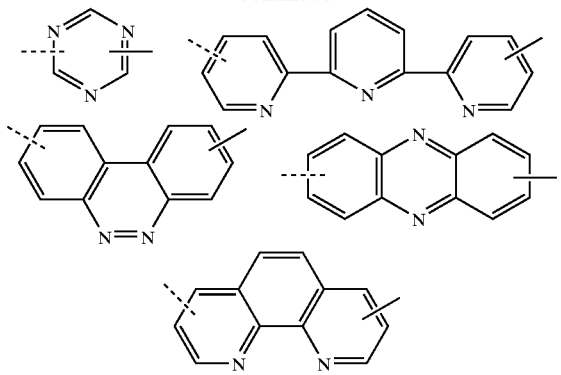

The polymers described herein have low k values and good thermal stability and have the additional property of being able to trap metals or metal ions that diffuse away from the conductive feature. This diffusion would otherwise limit device performance. The poly(arylene ethers) of the present invention can also be used as coatings, dielectric layers, encapsulants, barrier layers or substrates in applications not limited to microelectronic devices, including but not limited to integrated circuits and multichip modules, printed circuit boards, and photodiode arrays.

The poly(arylene ethers) of the present invention are prepared in high molecular weight by proper modification of the Ullmann ether condensation polymerization as described in Example 1. Ullmann ether condensation reaction uses copper catalyst. The nucleophilic aromatic substitution reaction is facilitated by cuprous ion. The solvent used in the polymerization is not critical as long as it is inert and is a solvent of the polymer that is formed. Hence the polymerization in the present invention uses cuprous salt as the catalyst and benzophenone as the solvent. The cuprous salt employed in the reaction is a cuprous halide. Cuprous halides are preferred since they are highly effective but other cuprous salts can also be employed.

As the Ullmann ether reaction requires high temperatures, the temperature used in the present invention is between 170° C. and 220° C. for a period of 40 to 48 hours. The optimum polymerization temperature and time depends upon the monomer used. The synthesis of the polymer involves monomers with dihydroxyl and dihalogenated aromatic units. The polymer of the present invention is prepared preferably with equal molar equivalents of the alkaline metal salt of dihydroxyl aromatic unit and dihalogenated unit.

The alkaline salt of the dihydroxyl aromatic unit can be prepared using alkaline metal, alkaline metal hydroxide, or alkaline metal hydride. This alkaline salt can be prepared separately or just before the polymerization steps.

The polymer obtained from the reaction can be recovered by any convenient manner, such as precipitation induced by cooling the reaction mass, by pouring the reaction mixture into a non-solvent, or by stripping off the solvent in the reaction mixture at reduced pressure and/or elevated temperature.

Since the polymerization reaction results in formation of an alkaline metal halide, it is preferred that the alkaline metal halide be removed by filtering the salt from the polymer solution or by Soxhlet-extracting the polymer to substantially free if from this salt.

The polymerization reaction described above was used to prepare three polymers whose dielectric constant (k), glass transition temperature (Tg), and decomposition temperature are listed in Table 1. Structures of the polymers are shown in Table 2.

TABLE 1

Properties of Poly(arylene ethers) 1a–1c

|  | 1a | 1b | 1c |
|---|---|---|---|
| Dielectric constant | ~2.43 | ~2.65 | ~2.35 |
| Decomposition temperature (in air)/° C. | 310 | 345 | 450 |
| Decomposition temperature (in nitrogen)/° C. | 355 | 325 | 450 |
| Glass transition temperature/° C. | 312 | 214 | 227 |
| Molecular weight | ~25,000 | ~11,000 | ~32,000 |

TABLE 2

Structures of Poly(arylene ethers) 1a–1c prepared from Ullmann Reaction

| Polymer synthesized | Symbol |
|---|---|
| 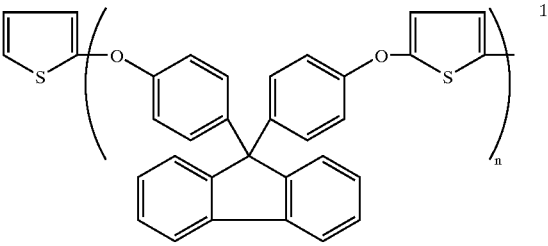 | 1a |
| 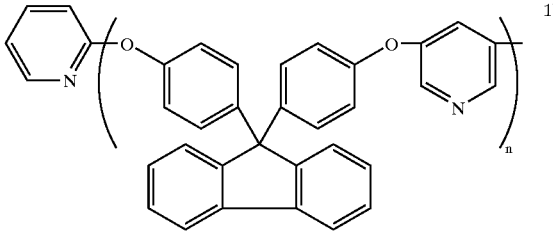 | 1b |
| 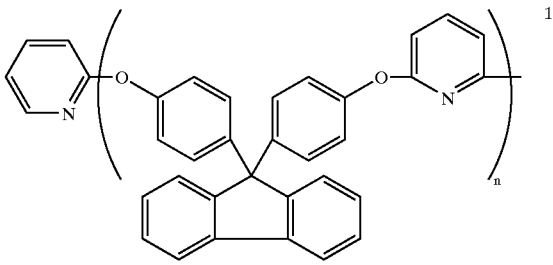 | 1c |

Poly(arylene ether) 1a contains a 2-substituted thiophene as $Ar_1$ and a 2,5-disubstituted thiophene as $Ar_2$. Poly(arylene ether) 1b contains a 2-substituted pyridine as $Ar_1$ and a 3,5-disubstituted pyridine as $Ar_2$. Poly(arylene ether) 1c contains a 2-substituted pyridine as $Ar_1$ and a 2,6-disubstituted pyridine as $Ar_2$.

The average molecular weight (MW) of each polymer was determined using a Waters HPLC system with three Phenomenex phenogel 5 micron mixed bed columns. One mg of polymer was dissolved in 10 ml of THF (HPLC grade). One hundred microliters of a 0.5 micron filtered solution was injected into the system and a refractive index (RI) detector was used to monitor the mobile phase. A Gel Permeation Chromatography (GPC) spectrum of RI vs. time was obtained and MW was determined by comparing the GPC spectrum with a measurement performed using narrow MW polystyrene standards.

The thermal stability of each polymer was studied by thermogravimetric analysis (TGA) using a TA instrument, TGA 2960. Approximately 5 to 10 mg of a finely divided polymer powder was heated from room temperature to 1000° C. in a ceramic cell at a linear heating rate of 10° C./minute. Heating was done in dry air and nitrogen with a flow rate of 75 cm³/minute.

The glass transition (Tg) of each polymer was determined by differential scanning calorimetry (DSC) using a TA instrument, DSC 2920. About 5 to 10 mg of finely divided polymer powder was enclosed in a hermetic pan. The hermetic pan containing the polymer and a reference hermetic pan were placed into the cell which was then heated at a linear heating rate of 10° C./minute in nitrogen. Heat flow of the polymer vs. temperature was recorded and processed with a Universal Analysis program.

Dielectric constant of each polymer was measured using a TA instrument, DEA 2970 Dielectric Analyzer. The mode function used in the instrument was parallel plate mode. All measurements were done in a nitrogen environment. Finely divided polymer powder was pressed into a pellet with a diameter of 25 mm and a thickness of 0.1 to 0.6 mm. The force used to press the pellet was 12 tons. The pellet was placed between parallel plate sensors and a sinusoidal voltage was applied. Permittivity (dielectric constant) of the polymer vs. temperature was recorded and processed using the Universal Analysis program.

EXAMPLE 1

Synthesis of Poly{Arylene ether} 1a

In a 50 ml flask, 0.06 gm (0.61 mmol) of copper(I) chloride was added to 0.6 ml of quinoline contained under a nitrogen blanket. The mixture was stirred at 25° C. for 48 hours. A mixture of 1 gm (2.86 mmol) of 9,9-bis(4-hydroxyphenyl)fluorene, 2.5 gm of toluene and 5 gm of benzophenone was charged to a 50 ml, 3-necked, round bottom flask fitted with a distillation set, magnetic stirrer and thermometer. The mixture was heated to 60° C. with stirring and in a nitrogen environment. After homogeneity had been reached, 0.263 gm (5.72 mmol) of aqueous sodium hydroxide solution was added dropwise to the mixture. A water azeotrope was then collected by vacuum distillation at an elevated temperature. After complete dehydration and removal of toluene, the reaction mixture was cooled to room temperature and the distillation set was replaced by a condenser. The reaction mixture was then heated to 80° C. and 0.69 gm (2.86 mmol) of 2,5-dibromothiophene was added. The reaction mixture was then heated to 180° C. and a 0.6 ml portion of copper(I) chloride/quinoline catalyst was added. The reaction mixture was maintained at 180° C. for 17 to 24 hours at which time most of the disodium salt of 9,9-bis(hydroxyphenyl)fluorene had gone into solution. A 0.02 gm portion of dry copper(I) chloride powder was added to the reaction mixture. The reaction temperature was increased to 190° C. and maintained for 24 hours. A 0.3 gm portion of 2-bromothiophene was added. After 1 hour, the reaction mixture was cooled to 100° C. and 5 gm of toluene was added. The reaction was then quenched in a rapidly stirred solution of acetic acid and methanol. The precipitate obtained was first Soxhlet-extracted with methanol for 24 hours followed by acetone for another 24 hours. Finally, the precipitate was Soxhlet-extracted using chloroform. The volume of the chloroform extract was reduced and reprecipitated in 100 ml of methanol. The polymer obtained was dried under vacuum at 70° C. overnight to obtain a yield of between 10% and 50%.

Those skilled in the art will recognize that other aromatics such as anthracene, terphenyl, and naphthalene, can be substituted for 9,9-bis(hydroxyphenyl)fluorene to obtain thermally stable poly(arylene ethers) with a low k value that are useful in the present invention.

While this invention has been particularly shown and described with reference to, the preferred embodiments thereof, it will be understood by those skilled in the art that various changes in form and details may be made without departing from the spirit and scope of this invention.

We claim:

1. A dual damascene method comprising:
   (a) providing a substrate in which a conductive layer has been formed;
   (b) forming sequentially a stack of layers on said substrate including a passivation layer at the bottom of said stack followed by a dielectric layer, a first etch stop layer, a second dielectric layer and a second etch stop or cap layer in which one or more layers in said stack is comprised of a poly(arylene ether) comprising the structure;

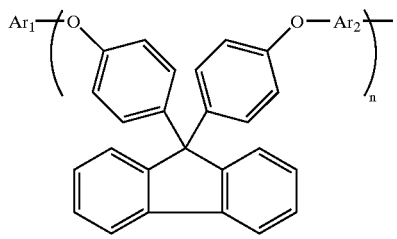

wherein n=5 to 10000; and monovalent radical $Ar_1$ and divalent radical $Ar_2$ are heteroaromatic groups that incorporate O, N, Se, S, or Te or combinations of the aforesaid elements;
   (c) forming a via hole and a trench in said stack of layers, said via hole is aligned above said conductive layer and said trench is above said via hole; and
   (d) depositing a barrier metal layer and a metal layer within said via and trench followed by planarizing said metal layer to be coplanar with the top of said stack.

2. The method of claim 1 wherein $Ar_1$ is a 2-substituted pyridine and $Ar_2$ is a 3,5-disubstituted pyridine.

3. The method of claim 1 wherein $Ar_1$ is a 2-substituted pyridine and $Ar_2$ is a 2,6-disubstituted pyridine.

4. The method of claim 1 wherein $Ar_1$ is a 2-substituted thiophene and $Ar_2$ is a 2,5-disubstituted thiophene.

5. The method of claim 1 wherein said poly(arylene ether) is further characterized as having a thermal stability of about 350° C. or greater.

6. The method of claim 1 wherein $Ar_1$ and $Ar_2$ are selected from the group comprised of;

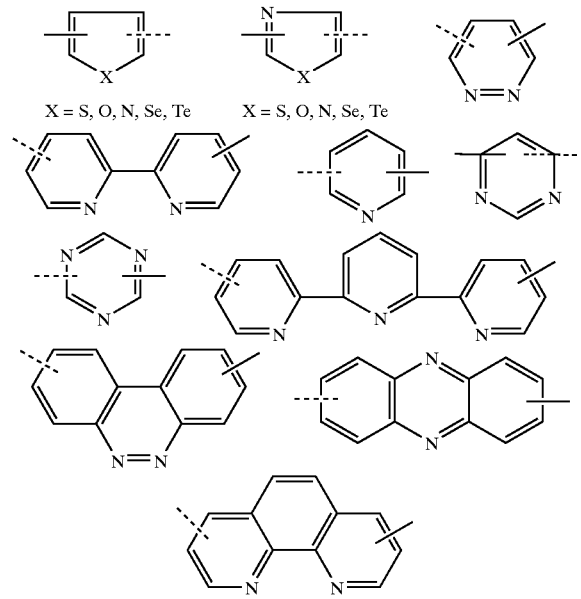

X = S, O, N, Se, Te         X = S, O, N, Se, Te

7. The method of claim 1 wherein said poly(arylene ether) is further characterized as having a dielectric constant of less than 3.

8. The method of claim 1 wherein the 9,9-bis (hydroxyphenyl) fluorene group is replaced by anthracene, phenanthrene, naphthalene, terphenyl or other aromatic groups that form a poly(arylene ether) with a low dielectric constant of less than 3 and a thermal stability to about 350° C. or greater.

9. The method of claim 1 wherein said poly(arylene ether) is dissolved in an organic solvent and spin coated to form a layer having a thickness between about 1000 and 15000 Angstroms.

10. The method of claim 9 wherein said poly(arylene ether) layer is baked between 50° C. and 250° C. for a period of from 0.5 to 30 minutes followed by curing in a furnace or by rapid thermal annealing at a temperature between 200° C. and 400° C. for a period of from 5 to 120 minutes.

* * * * *